(12) United States Patent
Callaway et al.

(10) Patent No.: US 9,091,343 B1
(45) Date of Patent: Jul. 28, 2015

(54) INFINITELY VARIABLE TRANSMISSION WITH CONTROLLED COASTING

(71) Applicant: Caterpillar Inc., Peoria, IL (US)

(72) Inventors: Joshua Callaway, Cary, NC (US);
Steven J. Juricak, Cary, NC (US);
Corwin E. Storer, Bartonville, IL (US)

(73) Assignee: Caterpillar Inc., Peoria, IL (US)

( * ) Notice: Subject to any disclaimer, the term of this patent is extended or adjusted under 35 U.S.C. 154(b) by 18 days.

(21) Appl. No.: 14/154,592

(22) Filed: Jan. 14, 2014

(51) Int. Cl.
*G06F 17/00* (2006.01)
*F16H 61/66* (2006.01)

(52) U.S. Cl.
CPC ...................... *F16H 61/66* (2013.01)

(58) Field of Classification Search
None
See application file for complete search history.

(56) References Cited

U.S. PATENT DOCUMENTS

| | | | |
|---|---|---|---|
| 3,402,549 A | 9/1968 | Connett et al. | |
| 6,029,107 A * | 2/2000 | Sato | 701/58 |
| 6,349,253 B1 * | 2/2002 | Bellinger | 701/53 |
| 6,896,640 B2 * | 5/2005 | Kurabayashi | 477/46 |
| 6,937,931 B2 | 8/2005 | Funato et al. | |
| 7,848,867 B2 | 12/2010 | Ueno | |
| 7,987,034 B2 * | 7/2011 | Taffin | 701/51 |
| 8,070,651 B2 | 12/2011 | Eastman et al. | |
| 8,301,349 B2 * | 10/2012 | Sauter | 701/62 |
| 8,589,045 B2 * | 11/2013 | Seymour et al. | 701/70 |
| 8,948,982 B2 * | 2/2015 | Elliott | 701/50 |
| 8,954,246 B2 * | 2/2015 | Siegel et al. | 701/55 |

* cited by examiner

*Primary Examiner* — Dirk Wright

(74) *Attorney, Agent, or Firm* — Leydig, Voit & Mayer, Ltd.

(57) ABSTRACT

A system for driving a machine is provided. A user input device inputs a desired throttle setting for the machine. The system includes an infinitely variable transmission having a transmission ratio that is adjustable. At least one sensor determines an inclination of the machine relative to a reference plane. A controller is configured to determine and apply a variable rate limit upon change in the transmission ratio based on the inclination of the machine when the desired throttle setting is reduced more than a predetermined amount and to adjust the rate limit based on the difference between an actual engine speed and a desired engine speed.

20 Claims, 3 Drawing Sheets

INFINITELY VARIABLE TRANSMISSION WITH CONTROLLED COASTING

TECHNICAL FIELD

This patent disclosure relates generally to infinitely variable transmissions for mobile machines and, more particularly, to infinitely variable drive transmissions and methods for controlling infinitely variable drive transmissions that provide controlled coasting of mobile machines.

BACKGROUND

Many mobile machines used in industries such as mining, construction and farming utilize infinitely variable transmissions, such as a hydrostatic drive transmission. A hydrostatic drive transmission utilizes a hydraulic pump and hydraulic motor combination to provide continuously variable torque and speed to the drive train of the machine. Such transmissions can provide certain advantages over mechanical transmissions including improved fuel economy.

A potential issue with hydrostatic drive transmissions is that they can provide an operator with a different "feel" under certain operating conditions than a traditional mechanical transmission. One example of a circumstance where a hydrostatic drive transmission can provide a different feel is when an operator reduces the throttle when the machine is in motion. In such circumstances, the machine will coast a certain distance as the engine slows down. Machines with hydrostatic transmissions are typically configured to decelerate in the same manner regardless of the load or engine speed. As a result, a machine with a displacement controlled hydrostatic drive transmission will coast a similar distance no matter whether the machine is travelling on flat ground, uphill or downhill when the operator reduces the throttle. This can be unintuitive to an operator who may be used to operating machines with traditional mechanical transmissions that generally coast more when travelling downhill than they coast when travelling uphill or on flat ground.

U.S. Pat. No. 8,070,651 discloses a work machine coast control system with an infinitely variable transmission. The control system is configured to determine a driver demand regarding deceleration of the machine at a time of coasting accompanied by an accelerator releasing operation. The controller is further configured to control the transmission to decelerate the vehicle according to the determined drive demand regarding deceleration. The control system does not provide any adjustment of the coasting of the machine based on the slope on which the machine is operating.

SUMMARY

In one aspect, the disclosure describes a system for driving a machine. The system includes a user input device for inputting a desired throttle setting for the machine. An infinitely variable transmission is provided that has a transmission ratio that is adjustable. At least one sensor is configured to determine an inclination of the machine relative to a reference plane. A controller is in communication with the user input device to receive the desired throttle setting and the sensor to receive information relating to the inclination of the machine. The controller is in communication with the hydraulic motor and the hydraulic pump and is configured to control the transmission ratio. The controller is configured to determine and apply a variable rate limit change in the hydrostatic transmission ratio based on the inclination of the machine when the desired throttle setting is reduced more than a predetermined amount.

In another aspect, the disclosure describes a machine including a user input device for inputting a desired throttle setting for the machine. The machine includes an engine and an engine speed sensor configured for determining an actual speed of the engine. The machine includes an infinitely variable transmission having a transmission ratio that is adjustable. A controller is in communication with the user input device to receive the desired throttle setting and the engine speed sensor to receive the actual engine speed. The controller is in communication with the infinitely variable transmission and configured to control the transmission ratio. The controller is configured to determine a desired engine speed based on the desired throttle setting and to determine and apply a variable rate limit upon change in the transmission ratio based on a difference between the actual engine speed and the desired engine speed when the desired throttle setting is reduced more than a predetermined amount.

In yet another aspect, the disclosure describes a method for controlling deceleration of a machine having an engine and an infinitely variable transmission with an adjustable transmission ratio. The method includes the step of determining when a desired throttle setting input by an operator is reduced more than a predetermined amount. A rate limit of change of the hydrostatic transmission ratio is determined based on at least one of an inclination of the machine or a difference between a desired engine speed based on the desired throttle setting and an actual engine speed. The rate limit of change is applied to adjust the transmission ratio in response to the reduction in the desired throttle setting.

DETAILED DESCRIPTION

Figure 1:
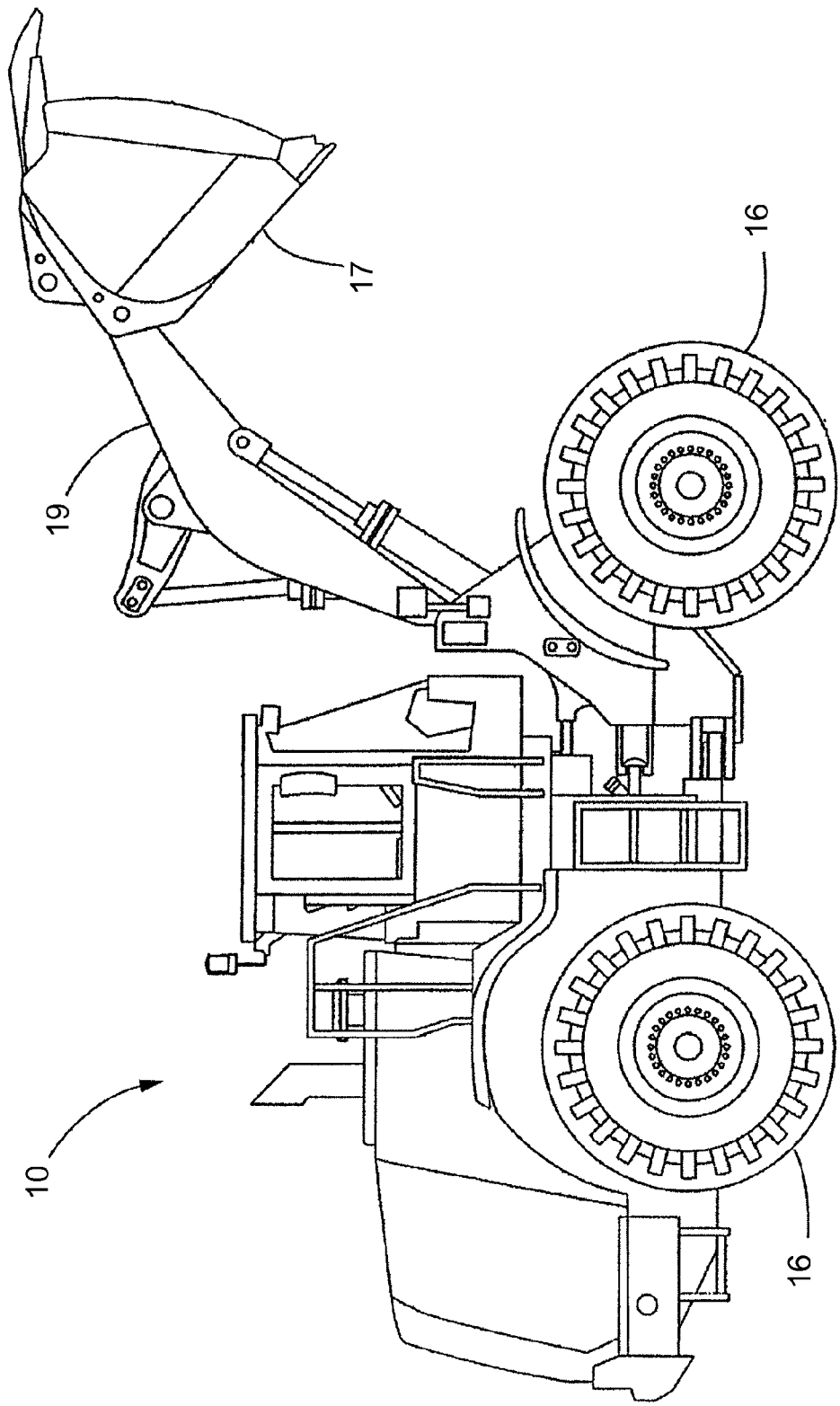
FIG. 1 is a schematic side view of an exemplary machine suitable for use with an infinitely variable transmission of the present disclosure.
Figure 2:
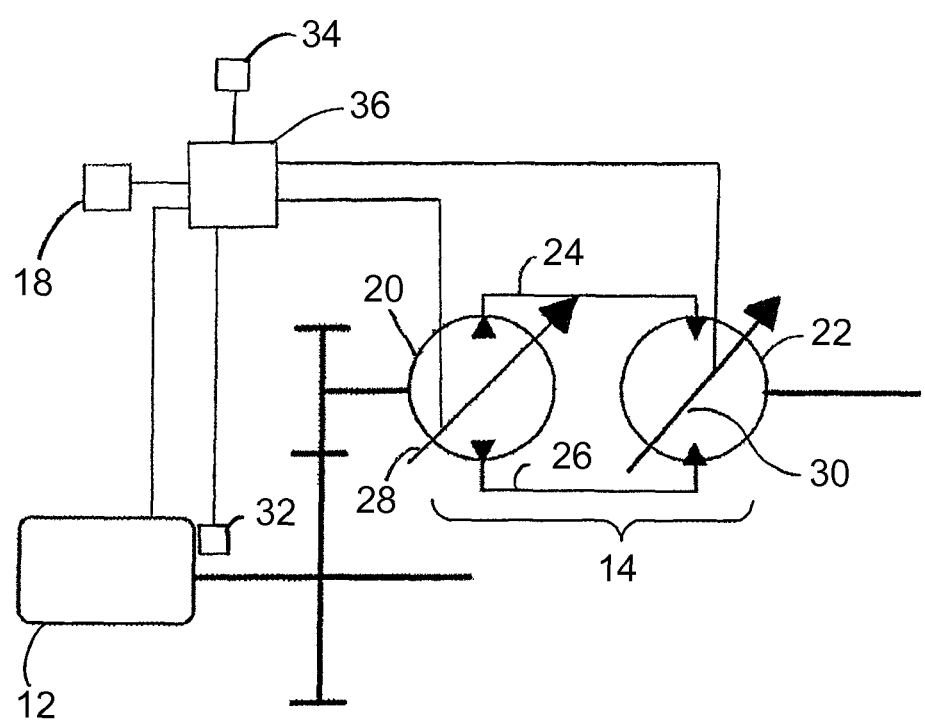
FIG. 2 is a schematic view of an infinitely variable transmission according to the present disclosure.

This disclosure generally relates to an apparatus and method for providing controlled coasting of a mobile machine having an infinitely variable transmission. With particular reference to FIGS. 1 and 2, an exemplary machine 10 having an engine 12 and an infinitely variable transmission is shown. In this case, the infinitely variable transmission is a hydrostatic drive transmission 14 (see FIG. 2) that can transmit power from the engine 12 to a load, such as one or more traction devices 16, that propel the machine in response to input received via operator input devices. In the embodiment of FIG. 1, the traction devices 16 comprise wheels. Alternatively, the traction devices may embody a track located on a side of the machine, a belt, or any other driven traction device.

In addition to transmitting power to the traction devices that propel the machine, the hydrostatic transmission 14 also may be used to transmit power to other loads such as, for example, an implement that is connected to the machine. In this case, the machine 10 includes a bucket 17 that is supported by a boom 19 (see FIG. 1) that is mounted to the body of the machine. The implements carried by the machine may be utilized for a variety of tasks, including, for example, loading, compacting, lifting, brushing, and include, for example, buckets, compactors, forked lifting devices, brushes, grapples, cutters, shears, blades, breakers/hammers, augers, and others.

While the hydrostatic drive transmission 14 is illustrated in connection with a wheel loader, the arrangement disclosed herein has universal applicability in various other types of machines having hydrostatic drive or other infinitely variable transmissions as well. In this regard, the term "machine" may refer to any machine that performs some type of operation associated with an industry such as mining, construction, farming, transportation, or any other industry known in the art. For example, the machine 10 may be an earth-moving machine, such as a wheel loader, track loader, bulldozer, excavator, dump truck, backhoe, motor grader, material handler or the like.

The engine 12 (see FIG. 2) may be configured to produce a power output and may include an internal combustion engine. For example, the engine 12 may include a diesel engine, a gasoline engine, a gaseous fuel-powered engine, or any other type of engine apparent to one skilled in the art. The engine 12 may produce a rotational mechanical output received by the hydrostatic drive transmission 14.

To allow an operator to input commands relating to a desired throttle setting for the machine, an operator input device 18 (shown schematically in FIG. 2) may be located within an operator station of the machine 10, for example, in close proximity to an operator's seat. By adjusting the desired throttle setting, the operator may adjust the speed and acceleration of the mobile machine. Manipulation of the operator input device 18 may generate signals indicative of a desired throttle setting for the machine. As described further below, the desired throttle setting may be used to determine a desired engine speed as well as the speed or acceleration of the machine. In one example, the operator input device 18 may embody a pedal. In another example, the operator input device 18 may embody a cruise control type button or switch that can be engaged to set the machine at a desired throttle setting or speed. It is contemplated, however, that the operator input device 18 may embody additional or different control devices such as, for example, joysticks, pedals, levers, switches, buttons, wheels, and other control devices known in the art.

With additional reference to FIG. 2, the hydrostatic drive transmission 14 may include a hydraulic pump 20 and a hydraulic motor 22 coupled in a closed loop hydraulic configuration. The pump 20 may be mechanically driven by the engine 12, while the motor 22 may mechanically drive the traction device 16. A first passageway 24 may direct pressurized fluid discharged from the pump 20 to the motor 22. A second passageway 26 may return used fluid from the motor 22 to the pump 20. It is contemplated that, in some embodiments, the functions of the first and second passageways 24, 26 may be reversed to thereby reverse the travel direction of the traction device 16, if desired. While a hydrostatic transmission is shown, the present disclosure is also applicable to other types of infinitely variable transmissions such as electrically coupled motors or toroidal transmissions.

The pump 20 may be a swashplate-type pump and include multiple piston bores, and pistons held against a tiltable swashplate 28. The pistons may reciprocate within the piston bores to produce a pumping action as the swashplate 28 rotates relative to the pistons. The swashplate 28 may be selectively tilted relative to a longitudinal axis of the pistons to vary a displacement of the pistons within their respective bores. The angular setting of the swashplate 28 relative to the pistons may be carried out by any actuator known in the art, for example, by a servo motor. Although shown in FIG. 2 as producing only a unidirectional flow of pressurized fluid, it is contemplated that the pump 20 may be an over-center type pump or rotatable in opposing directions to produce flows of fluid in opposing directions, if desired.

The motor 22 may be a fixed or variable displacement type motor fluidly coupled to the pump 20. The motor 22 may convert the pressurized fluid from pump 20 into a rotational output of traction device 16. As a variable displacement motor, the motor 22 may include multiple piston bores and pistons (not shown) held against a fixed or rotatable swashplate 30. The angle of the swashplate 30 may determine an effective displacement of the pistons relative to the bores of the motor 22. The angular setting of the swashplate 30 relative to the pistons may be carried out by any actuator known in the art, for example, by a servo motor. The respective displacements of the pump and the motor may define a hydrostatic transmission ratio.

The machine 10 may be equipped with a plurality of sensors or sensing devices that gather data from various components and systems and generate signals that are directly or indirectly indicative of various machine parameters associated with the performance and operating conditions of the machine. Sensors may be associated with, for example, the engine 16 and may include an engine speed sensor 32 configured to determine the operating speed of the engine. Sensors may also be provided that can be used to monitor the output ratio of the hydrostatic transmission. Other sensors may automatically gather real-time data such as the operation of engine 16, the position of and load on the work implements, fluid pressure, flow rate, temperature, contamination level, and/or viscosity, fluid (i.e., fuel, oil, water, etc.) levels and consumption rates, electric current and/or voltage levels, engagement status of the parking brake, loading levels (e.g., payload value, percent of maximum allowable payload limit, payload history, payload distribution, etc.), and other desired information. In addition, various sensors may be associated with the machine 10 that may be used to determine machine travel characteristics (e.g., speed, acceleration, torque, slip rate, etc.) as well as the position and orientation of machine 10. Such sensors may include a sensor 34 that is configured to determine the inclination of the machine relative to a reference plane. A combination of multiple sensor inputs may also be used to provide a signal indicative of machine incline.

A controller 36 may be provided to facilitate operation of the machine including the hydrostatic drive transmission 14. As schematically shown in FIG. 2, the controller 36 may be in communication with the operator input device 18 to receive information relating to the desired throttle setting, the pump 20, the motor 22, the engine 12, the engine speed sensor 32 to receive the actual engine speed and the sensor 34 to receive information relating to the machine incline. The controller 36 may be further configured to generate control signals for regulating operation of the pump 20 and the motor 22. More particularly, the controller 36 may be configured to control displacement of the pump 20 and the motor 22 by, for example, controlling a pump actuator device (e.g., a solenoid and spool valve) to vary the displacement of the pump 20. Additionally, the pump actuator device may provide information to the controller about actual or commanded displacement of the pump 20. Similarly, the displacement of the motor 22 may also be controlled by a motor actuator device. The motor actuator device may also provide information to the controller about actual or commanded displacement of the motor 22. The controller 36 may control displacement of the pump 20 and motor 22 based on information received from the operator input device 18 and the various sensors. Through adjustment of the displacements of the pump 20 and motor 22, the controller 36 can control the hydrostatic transmission ratio. The controller 36 may be in communication with the operator input device 18, the engine speed sensor 32, the sensor 34 for determining machine incline, the pump 20 and the motor 22 via control lines, which may carry digital, analog, or mixed types of signals. Alternatively, communication with the various components may be implemented by mechanical or hydraulic lines.

The controller 36 may be a single controller or may include more than one controller disposed to control various functions and/or features of the machine 10. For example, the machine may include separate controllers for the hydrostatic transmission and for the engine. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions of the machine 10 that may be stored in the memory of controller 36. Each of these maps may include a collection of data in the form of tables, graphs, and/or equations. The controller 36 may use the data maps to maximize the efficiency of the machine 10.

The controller 36 may embody a single microprocessor or multiple microprocessors. Numerous commercially available microprocessors may be configured to perform the functions of the controller 36. It should be appreciated that the controller 36 may readily embody a general machine microprocessor capable of controlling numerous machine functions. Various other circuits may be associated with the controller 36, such as power supply circuitry, signal conditioning circuitry, data acquisition circuitry, signal output circuitry, signal amplification circuitry, and other types of circuitry known in the art.

The control system, including the controller 36 and the associated sensors, may be configured to provide controlled or adjusted deceleration or coasting of the machine 10 when an operator signals for a reduction in the desired throttle setting of more than a predetermined amount through the operator input device 18. For instance, where the operator input device 18 is an accelerator pedal, the controlled coasting of the machine 10 may be applied when an operator removes his foot from the accelerator pedal. More specifically, the controller 36 may be configured to adjust the deceleration or coasting of the machine 10 in such circumstances so as to mimic the coasting behavior of a standard mechanical transmission in which the machine coasts more when traveling down an incline, coasts less when traveling up an incline and coasts an intermediate amount when traveling on even or level ground. Such coasting behavior can be more intuitive to an operator because it is consistent with their experiences with conventional mechanical transmissions.

The controlled or adjusted coasting of the machine 10 can be accomplished by configuring the controller 36 to limit the rate at which the machine 10 decelerates, and thereby how much the machine 10 coasts, through adjustment of the hydrostatic transmission 14 based on the inclination of the machine as determined by the sensor 34. More specifically, the rate at which the machine 10 decelerates can be adjusted by configuring the controller 36 to limit the rate at which the hydrostatic transmission ratio changes. The controller 36 may also be configured to adjust the rate limit on changes in the hydrostatic transmission ratio based on a difference between a desired speed of the engine 12 (as determined from the desired throttle setting) and the actual speed of the engine 12 (as determined by the engine speed sensor 32). The adjustment of the rate limit based on the difference between the desired engine speed and the actual engine speed can be performed in place of or in addition to the adjustment of the rate limit based on inclination of the machine 10.

Figure 3:
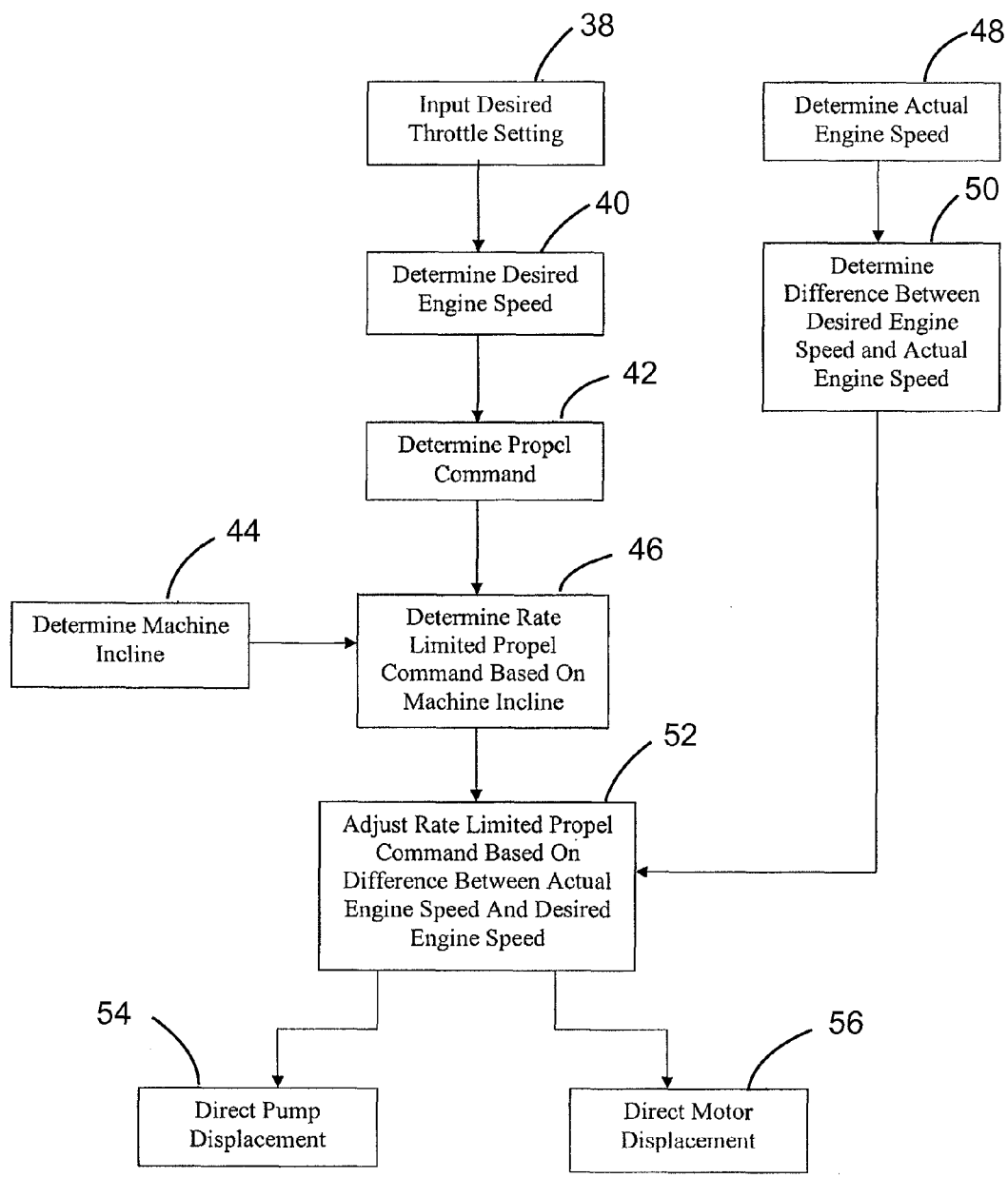
FIG. 3 is a flow chart illustrating one method of controlling coasting of an infinitely variable transmission according to the present disclosure.

Referring to FIG. 3 of the drawings, a schematic flow diagram is provided that includes various steps that may be included in the control system and implemented by the controller 36 to provide controlled or adjusted machine coasting. In an initial step 38, the operator uses the operator input device 18 to reduce the desired throttle setting. If the desired throttle setting is reduced more than a predetermined amount the controller 36 may be configured to control or adjust the deceleration or coasting of the machine. One step (step 40 in FIG. 3) involved in that process is determining a desired engine speed command based on the desired throttle setting entered by the operator in step 38. A propel command for the hydrostatic transmission is also determined based on the throttle command input by the operator in step 42. The propel command can represent a desired transmission ratio of the hydrostatic transmission.

In step 44, the machine incline is determined. This step can be performed by the sensor 34 and communicated to the controller 36. Alternate methods also could be used to determine machine incline. The machine incline data produced by the sensor 34 can include whether the machine 10 is traveling up an incline, down an incline or traveling on level ground and a measurement of the angle of inclination of the machine relative to a reference plane. In step 46, the controller 36 takes the machine incline data and determines a rate limited propel command based on the machine incline. In particular, the rate limited propel command can be an adjustment applied to the propel command from step 42 in which the rate of change of the hydrostatic transmission ratio is limited to a determined amount. For example, the controller 36 may be configured such that when the sensor 34 determines that machine is traveling down an incline, the rate limit on the propel command is set low so that the propel command (i.e., the transmission ratio) does not change significantly despite the operator reducing the desired throttle setting. This allows a longer coast for the machine 10 after the operator reduces the throttle command. Conversely, the controller 36 may be configured such that when the sensor 34 determines that the machine 10 is travelling up an incline, the rate limit is set relatively higher which allows the propel command (i.e., the transmission ratio) to change more rapidly resulting in a faster deceleration of the machine 10 as compared to when traveling down an incline. Accordingly, the machine 10 coasts a shorter distance when traveling up an incline as compared to when traveling down an incline.

The rate limit adjustment of the propel command may be further adjusted based on the amount of incline determined by the sensor 34 and the controller 36. For example, the rate limit may be set lower when the machine 10 is traveling down steeper inclines than when traveling down more gradual inclines. Similarly, the rate limit may be set higher when traveling up a steeper incline than when traveling up a more gradual incline. To this end, the controller 36 could include a map or the like that contains different rate limits for different machine inclinations.

In step 48, the actual engine speed is determined, such as through the engine speed sensor 32 communicating with the controller 36. The controller 36 then compares the actual engine speed from step 48 to the desired engine speed from step 40 to determine the difference therebetween in step 50. The difference between the actual and the desired engine speeds is then applied by the controller 36 in step 52 to adjust the rate limited propel command that, in this case, is produced in step 46 based on the machine inclination. As noted previously, the step 52 of applying a rate limit to the propel command based on the difference between the actual engine speed and the desired engine speed can be performed instead of step 46 to provide a different type of controlled coasting of the machine or in addition to step 46 as shown in FIG. 3 to provide further adjusted coasting of the machine.

In order to provide the engine speed adjustment to the rate limit on the propel command determined in step 46, the controller 36 may be configured to provide a higher rate limit on the propel command, and thereby provide more aggressive deceleration, when the difference between the desired engine speed and the actual engine speed is small, including when the difference is zero. For example, when the operator reduces the throttle setting to zero, the further deceleration of the machine 10 can be limited, so as to provide an unusually long machine coast, when the engine 12 reaches its low idle speed because reduced engine speed can no longer be used to slow the machine. In such circumstances the actual engine speed, i.e. the engine's low idle speed, matches the desired engine speed. Accordingly, when the difference between the desired engine speed and the actual engine speed is low or zero, the rate limit on the propel command can be increased in order to allow the hydrostatic transmission 14 to provide further deceleration of the machine 10 through appropriate adjustment of the hydrostatic transmission ratio. Conversely, when the difference between the desired engine speed and the actual engine speed is high, such as the time shortly after the operator reduces the throttle command, only a small or no adjustment in the rate limit may be performed by the controller 36 in step 52 because the reducing engine speed still can be used to help decelerate the machine.

The rate limited propel command produced in steps 46 and/or 52 is then used by the controller to direct the displacement settings of the pump 20 and/or motor 22 in steps 54 and 56. The directed displacement settings for the hydraulic pump 20 and hydraulic motor 22 are such that the desired hydrostatic transmission ratio for the controlled coasting of the machine 10 is produced.

INDUSTRIAL APPLICABILITY

The present disclosure is applicable to any type of mobile machine having an infinitely variable transmission, including, for example, an electric, toroidal or hydrostatic transmission. The disclosure is particularly applicable to machines that are driven in environments in which the coasting feel of a mechanical transmission may be desirable. By adjusting the rate limits on the propel command based on machine inclination, the control system of the present disclosure allows a hydrostatic transmission to mimic the coasting characteristics of a mechanical transmission in that the machine will coast farther when traveling downhill than when traveling uphill. This is in contrast to a typical hydrostatic transmission with which a machine will coast the same distance when traveling uphill and when traveling downhill.

The adjustment of the propel command based on the difference between the desired and actual engine speeds also allows the deceleration and coasting of machines with hydrostatic transmissions to be more consistent with the coasting and deceleration experienced with machines having mechanical transmissions. One circumstance where the adjustment of the rate limit based on the difference between the desired engine speed and the actual engine speed can have a significant impact is when decelerating or coasting on level ground. In particular, hydrostatic transmissions can provide an unusually long coast when operating on level ground because the deceleration slows considerably once the engine reaches the low idle speed. Adjusting the rate limit under such circumstances allows a hydrostatic transmission to provide a more intuitive machine coast with a uniform deceleration of the machine.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A system for driving a machine comprising:
   a user input device for inputting a desired throttle setting for the machine;
   an infinitely variable transmission having a transmission ratio that is adjustable;
   at least one sensor configured to determine an inclination of the machine relative to a reference plane; and
   a controller in communication with the user input device to receive information relating to the desired throttle setting and the sensor to receive information relating to the inclination of the machine; the controller being in communication with the infinitely variable transmission and configured to control the transmission ratio, the controller being configured to determine and apply a variable rate limit upon change in the transmission ratio based on the inclination of the machine when the desired throttle setting is reduced more than a predetermined amount.

2. The system according to claim 1 wherein the controller is configured such that the rate limit determined by the controller is different when the sensor determines the machine is traveling down an incline as compared to the rate limit determined by the controller when the sensor determines the machine is traveling up an incline.

3. The system according to claim 2 wherein the rate limit determined by the controller is relatively lower when the sensor determines the machine is traveling down an incline than the rate limit determined by the controller when the sensor determines the machine is traveling up an incline.

4. The system according to claim 2 wherein the controller is configured such that the rate limit determined by the controller varies depending upon a degree of incline determined by the sensor.

5. The system according to claim 1 further including an engine and wherein the infinitely variable transmission comprises a hydrostatic transmission including a hydraulic pump operatively connected to the engine and a hydraulic motor operatively connected to the hydraulic pump.

6. The system according to claim 5 further including an engine speed sensor configured for determining an actual speed of the engine.

7. The system according to claim 6 wherein the controller is configured to determine a desired engine speed based on the desired throttle setting and to adjust the rate limit based on a difference between the actual engine speed and the desired engine speed when the desired throttle setting is reduced more than a predetermined amount.

8. The system according to claim 7 wherein the controller is configured such that the rate limit determined by the controller is lower when the difference between the actual engine speed and the desired engine speed is relatively higher than when the difference between the actual engine speed and the desired engine speed is relatively lower.

9. A machine comprising:
a user input device for inputting a desired throttle setting for the machine;
an engine;
an engine speed sensor configured for determining an actual speed of the engine;
an infinitely variable transmission having a transmission ratio that is adjustable; and
a controller in communication with the user input device to receive information relating to the desired throttle setting and the engine speed sensor to receive information relating to the actual engine speed, the controller being in communication with the infinitely variable transmission and configured to control the transmission ratio, the controller being configured to determine a desired engine speed based on the desired throttle setting and to determine and apply a variable rate limit upon change in the transmission ratio based on a difference between the actual engine speed and the desired engine speed when the desired throttle setting is reduced more than a predetermined amount.

10. The machine according to claim 9 wherein the controller is configured such that the rate limit determined by the controller is lower when the difference between the actual engine speed and the desired engine speed is relatively higher than when the difference between the actual engine speed and the desired engine speed is relatively lower.

11. The machine according to claim 9 further including at least one sensor configured to determine an inclination of the machine relative to a reference plane and wherein the controller is in communication with the sensor and configured to adjust the rate limit based on the inclination of the machine when the desired throttle setting is reduced more than a predetermined amount.

12. The machine according to claim 11 wherein the controller is configured such that the rate limit determined by the controller is different when the sensor determines the machine is traveling down an incline as compared to the rate limit determined by the controller when the sensor determines the machine is traveling up an incline.

13. The machine according to claim 12 wherein the rate limit determined by the controller is relatively lower when the sensor determines the machine is traveling down an incline than the rate limit determined by the controller when the sensor determines the machine is traveling up an incline.

14. The machine according to claim 13 wherein the controller is configured such that the rate limit determined by the controller varies depending upon a degree of incline determined by the sensor.

15. A method for controlling deceleration of a machine having an engine and an infinitely variable transmission having a transmission ratio, the method comprising the steps of:
determining when a desired throttle setting input by an operator is reduced more than a predetermined amount;
determining a variable rate limit of change on the transmission ratio based on at least one of an inclination of the machine or a difference between a desired engine speed based on the desired throttle setting and an actual engine speed; and
applying the rate limit of change to adjustment of the infinitely variable transmission in response to the reduction in the desired throttle setting.

16. The method according to claim 15 wherein the rate limit is different when the machine is traveling down an incline as compared to the rate limit determined when the machine is traveling up an incline.

17. The method according to claim 16 wherein the rate limit is relatively lower when the machine is traveling down an incline than the rate limit when the machine is traveling up an incline.

18. The method according to claim 16 wherein the rate limit varies depending upon a degree of incline.

19. The method according to claim 15 wherein the rate limit is lower when the difference between the actual engine speed and the desired engine speed is relatively higher than when the difference between the actual engine speed and the desired engine speed is relatively lower.

20. The method according to claim 15 wherein the rate limit is based on both an inclination of the machine and a difference between a desired engine speed based on the desired throttle setting and an actual engine speed.

* * * * *